Dec. 19, 1967     L. B. FARMER     3,358,496
CHROMATOGRAPHIC APPLICATOR
Filed Aug. 3, 1965
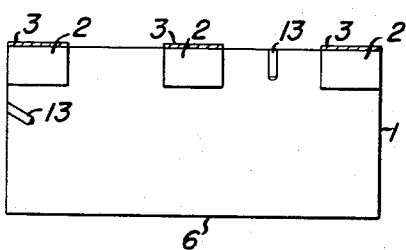
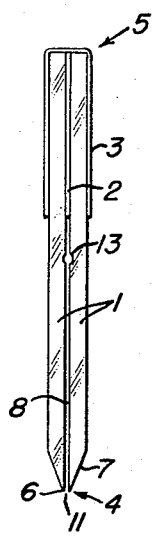
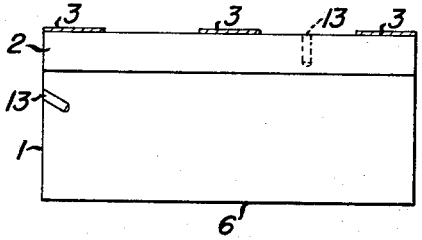
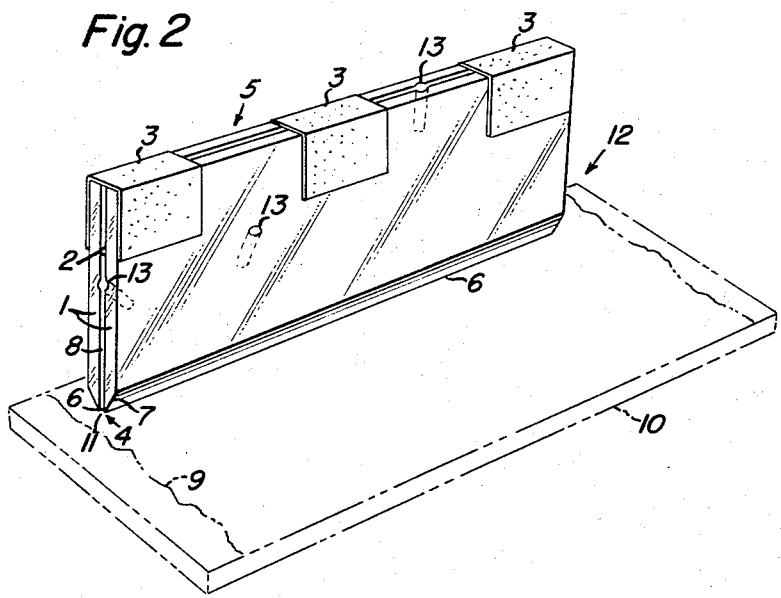
INVENTOR.
Larry B. Farmer
BY Harry M. Saragovitz
Edward J. Kelly
Herbert Berl
Benjamin F. Colley
ATTORNEY

United States Patent Office 3,358,496
Patented Dec. 19, 1967

3,358,496
CHROMATOGRAPHIC APPLICATOR
Larry B. Farmer, 107 Duval Drive,
Spartanburg, S.C. 29302
Filed Aug. 3, 1965, Ser. No. 477,051
4 Claims. (Cl. 73—61.1)

ABSTRACT OF THE DISCLOSURE

A chromatographic capillary applicator wherein the improvement in combination therewith comprises a specimen holder for receiving solution and comprising a combination of a pair of parallel plates, separator means between said plates, clamping means securing said plates and said separator together in a unit, said plates having a beveled edge to provide a uniform wedge aperture for the capillary receiving of said solution.

---

This invention described herein may be manufactured and used by or for the Government of the United States of America for governmental purposes without the payment to me of any royalty thereon.

This invention relates to a new and useful improvement in a capillary applicator apparatus for use in applying a thin line of solution or substrate solution to a layer of adsorbent material so that a mixture of compounds becomes adsorbed thereon.

It has long been the desire of persons in the chromatography art to deposit a solution or substrate solution to a chromatographic plate in a thin uniform line without significant damage to the adsorbent layer.

There have been two essentially different techniques employed, thin-layer chromatography with binder and thin-layer chromatography without binder. When a binder such as plaster of paris is used, the plates are relatively non-fragile, and the substrate solution can be applied to the adsorbent in a variety of ways, although the ones employing the simpler devices have been laborious. Moreover, the satisfactory preparation of such plates is cumbersome, in that the adsorbent must be spread wet onto glass plates, and then dried in a lengthy procedure. The preparation of non-bound plates is easier, since the adsorbent is spread dry onto the glass plates. These loose adsorbent thin layers, however, are easily damaged and the application of substrate solution to them in a thin uniform line has been difficult. Micropipettes and hypodermic syringes have been used to apply solutions or substrate solutions to these adsorbent layers but these applicators have proved to be unsatisfactory to all but the most experienced workers.

I have devised an apparatus for use in holding a solution or substrate solution between a pair of plates prior to depositing it in a thin, uniform line on a preparative thin layer chromatographic plate. The device described herein is simple, easy to use and can be employed on both bound and non-bound thin-layer plates. The loose adsorbent thin layers are not damaged by this apparatus which is very important in the chromatographic art. The use of my applicator facilitates more rapid separation procedures and provides improved resolution.

The primary object of my invention is the provision of a specimen holder having a uniform gap and possessing a wedge aperture that will fill itself by means of capillary attraction and will allow contact with the unbound adsorbent layer with the keen edges of the wedge aperture of the specimen holder to allow the adsorbent to withdraw the test solution from between the plates of the specimen holder. Thus a thin, uniform line of material is deposited without significant damage to said layer.

A further object of this invention is the provision of a capillary-type apparatus that is rugged, durable, easy to operate and economical to manufacture.

A further object of my invention resides in a simple apparatus whereby the present objects and advantages can be achieved without recourse to any special, difficult or expensive procedural or mechanical details.

A further preferred embodiment of my invention consists of the wedge aperture having corresponding acute angles in the range of 30° to 60° formed by the beveled edge and the interior surface of each plate diverging from the same keen edge.

Other and further objects and advantages will be understood by those skilled in the art or will be apparent to them when the specification is considered in connection with the accompanying drawing. In which drawing:

FIG. 1 is a side cutaway view of my applicator.

FIG. 2 is a perspective view of my applicator positioned on a chromatographic plate.

FIG. 3 is an interior linear perspective view of my applicator depicting interspersed separators.

FIG. 4 is an interior linear perspective view of my applicator depicting a full length continuous separator.

In the drawing, a preferred form of the invention is shown in which like reference characters designate like parts throughout the two views.

Referring to FIGS. 1 through 4 of the drawing, 1 represents the plates of the specimen holder as shown at 5. usually made of glass (⅛ inch-thick x 19 cm. wide x 5 cm. high) but may be any desirable dimension depending upon the size of chromatographic plate 10 employed. The plates 1 may be constructed of other materials such as stainless steel, aluminum, copper, brass, other alloys, plastics and any other suitable material.

The separator or spacer 2 is placed at intervals between the plates 1 of the specimen holder or in a position so that the separator 2 extends between the two plates 1 for substantially the entire width thereof, as shown at 5 and in FIGS. 3 and 4, terminating short of the uppermost portion thereof and extending downward for a distance as far as feasible without contacting said substrate solution. This separator or spacer 2 is made of aluminum foil, and can be constructed of any material which will not be attacked by said test solution. The number of layers of spacer material employed will depend upon the desired gap or separation 8. The spacer material 2 must produce a uniform gap or separation 8 throughout the entire width of the applicator as shown at 5 and in FIG. 4. The thickness of the separator 2 may be determined by the surface tension and/or viscosity of the test sample solution. The separator 2 can be used in conjunction with a holding device 3 such as tape, screws, bolts, clamps, spring clips, etc. Alternatively, there could be provided movable or adjustable spacers, such as a small spring clamp or related device, a set screw type arrangement or other suitable contrivances which could be used with a movable holding device 3.

My invention comprises a pair of rectangular plates 1 separated by a spacer 2 and said plates 1 having the surface 7 beveled to a sharp edge 6 in the direction of the long dimension at the open end 11 for the capillary attraction of the test sample to within the opening 8 wherein the slanting surface 7 of each plate 1 together form a wedge as shown at 4. The wedge as shown at 4 containing keen or sharp edges 6 as shown in FIGURES 1 and 2 is considered to be a critical feature of my invention.

A minimum amount of contact surface between the keen edges 6 of the rectangular plates 1 and the adsorbent layer 9 on the chromatographic plate 10 is the reason for depositing a thin, uniform line of solution upon said layer 9 whereby development with a solvent then gives relatively narrow bands which are substantially straight and uniform.

In operation, the applicator or specimen holder as shown at 5 is fixed in a level stationary position and the test solution is placed in a trough of an appropriate size to accommodate the wedge, as shown at 4. The trough is then placed beneath the wedge, as shown at 4 and raised up to bring the wedge into contact with the surface of the solution. In this manner some of the solution is drawn up between the gap 8 of the plates 1 by capillary action. The charged applicator as shown at 5 is levelled again carefully and the chromatographic plate 10 containing said adsorbent layer 9 is raised as shown at 12 with an instrument such as a laboratory jack until contact of said layer 9 is established with the wedge, as shown at 4. The layer of adsorbent material 9 on the chromatographic plate 10 in contact with the keen edges 6 of the wedge aperture 11 as shown at 12 draws out the solution from the specimen holder as shown at 5 and deposits a thin, uniform line of material without significant damage to said layer 9.

This method has proved quite satisfactory in resolving on a single plate a mixture containing up to 100 mg. of material and allowing the processing of 2 grams of mixture in one day.

The chromatographic plate 10 containing said thin uniform line of material thereon is removed from said applicator 5. A developing solvent for said material is placed in a Pyrex dish or any suitable container of sufficient size to accommodate said plate 10. The plate edge parallel and adjacent to the line of said material is placed in the developer and held in place by a supporting means at such an angle that the unbound adsorbent layer 9 remains intact. The adsorbent layer at said plate edge barely makes contact with said developer thus permitting a capillary action to take place whereon said developer produces relatively narrow bands which are straight and uniform. Said bands can then be observed in said position for the desired results or they may be completely removed with pertinent equipment for further chemical analysis.

Furthermore, the applicator as shown at 5 can be provided with filling ports 13, so that the space 8 between the plates 1 can be charged by means of an eye dropper, hypodermic syringe, etc. in lieu of dipping the wedge aperture 11 into the test solution.

It will thus be seen that I have provided a capillary applicator as shown at 5 that is easy to manufacture, the parts of which are cheaply and easily replaced and which can be easily assembled. By the use of my applicator as shown at 5 in the chromatography art, it is possible to obtain quick and accurate results without significant damage to the adsorbent layer 9 of the chromatographic plate 10.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

Having thus described my invention, what I claim as new and desire to secure by United States Patent is:

1. In a chromatographic applicator, the improvement in combination therewith comprising a specimen holder for receiving a test solution the combination of a pair of parallel rectangular plates, separator means positioned lengthwise between said plates at the upper edge thereof, said plates having slanting surfaces along their corresponding long dimension, remote from the separator beveled to a sharp edge, clamping means secured to said plates to both sides of said separator, said pair of plates extending downwardly beyond the terminus of said separator plate and along the entire width of said separator in a spaced relationship equal to the thickness of said separator, the spaced relationship of said beveled edges providing a uniform wedge aperture for the reception of said test solution.

2. The combination as specified in claim 1 wherein said separator means is placed at intervals between the uppermost portion of said rectangular plates and said plates are fastened together in several places with strips of masking tape.

3. In a chromatographic capillary applicator for receiving a test solution the improvement in combination therewith comprising the combination of a pair of parallel rectangular plates, said plates having corresponding inclined surfaces in the direction of their long dimension at the open end beveled to a sharp edge wherein the opposite sides of the slanting surface of each plate together form a wedge, a separator positioned between said plates, means of securing the separator and external plates together, said plates extending downwardly beyond the terminus of said separator and terminating there below, the extension of said plates below said separator forming a space of uniform width equal to the thickness of the separator and having the end open for the capillary attraction of the test solution to within said opening.

4. The combinaion as specified in claim 3 wherein said capillary applicator has a filling port for adding said test solution.

No references cited.

DAVID SCHONBERG, *Primary Examiner.*